United States Patent [19]

Bingley

[11] Patent Number: 4,631,470
[45] Date of Patent: Dec. 23, 1986

[54] CURRENT SURGE LIMITED POWER SUPPLY

[75] Inventor: John D. Bingley, Bucks County, Pa.

[73] Assignee: RCA Corporation, Princeton, N.J.

[21] Appl. No.: 808,633

[22] Filed: Dec. 13, 1985

[51] Int. Cl.[4] .................................................. G05F 1/56
[52] U.S. Cl. ...................................... 323/282; 323/222;
323/908; 363/56; 361/57
[58] Field of Search ..................... 363/21, 37, 41, 48,
363/53, 55, 56; 323/901, 908, 222, 282; 361/57,
58, 111

[56] References Cited

U.S. PATENT DOCUMENTS

| | | | |
|---|---|---|---|
| 3,017,564 | 1/1962 | Barney . | |
| 3,688,154 | 8/1972 | Christopher | 315/27 TD |
| 3,781,637 | 12/1973 | Potter | 321/11 |
| 3,801,857 | 4/1974 | Luz | 315/27 TD |
| 3,898,525 | 8/1975 | Steckler | 315/411 |
| 3,935,511 | 1/1976 | Boulanger et al. | 361/58 |
| 3,935,527 | 1/1976 | Michelet et al. | 321/11 |
| 3,996,506 | 12/1976 | Kichak | 361/111 X |
| 4,091,434 | 5/1978 | Suzuki et al. | 361/58 X |
| 4,236,198 | 11/1980 | Ohsawa et al. | 363/49 |
| 4,254,443 | 3/1981 | Wilson, Jr. | 363/21 X |
| 4,271,460 | 6/1981 | Baker | 363/49 |
| 4,321,447 | 3/1982 | Lamb | 323/908 X |
| 4,376,957 | 3/1983 | Dischert et al. | 358/334 |
| 4,414,572 | 11/1983 | Flory | 358/172 |
| 4,494,064 | 1/1985 | Harkness | 323/277 |
| 4,555,741 | 11/1985 | Masaki | 361/58 |
| 4,573,113 | 2/1986 | Bauman | 363/48 |
| 4,586,120 | 4/1986 | Malik et al. | 363/21 |

OTHER PUBLICATIONS

Article "MOS FETs Rise to New Levels of Power" by Rudy Severns, published at pp. 143–152 of the May 22, 1980, issue of Electronics magazine.
Article "BiMOS ICs–Combining Bipolar and MOS Technology in Monolithic ICs" published at p. 5 of the Dec. 1978 issue of RCA Trend.

Primary Examiner—Patrick R. Salce
Assistant Examiner—Emanuel Todd Voeltz
Attorney, Agent, or Firm—Joseph S. Tripoli; Robert L. Troike; William H. Meise

[57] ABSTRACT

An inrush current limited power supply includes a regulator with a capacitor coupled across its input terminals. If voltage to be regulated is suddenly applied by a switch to the input terminals of the regulator, an undesirably large current surge occurs as the capacitor charges. The magnitude of the current surge is limited by a surge limiting resistor coupled in series with the switch. This limits the surge current, but undesirably causes power dissipation in the resistor during normal operation. The channel of a FET is connected across the resistor. The FET has a conductivity which is low when the gate-to-source voltage is low, for preventing large inrush current immediately after turn-on. A control voltage generator generates a control voltage by rectifying an alternating voltage, and it is coupled to the gate and source of the FET. In one embodiment, the control voltage generator is referenced to an input terminal of the regulator. In another embodiment it is referenced to output terminal. The alternating voltage may be generated by an oscillator, or it may be derived from operation of a switching regulator.

20 Claims, 7 Drawing Figures

CURRENT SURGE LIMITED POWER SUPPLY

This invention relates to regulated power supplies, and more particularly to power supplies in which the amplitude of the input current surge at initial turn-on is limited.

BACKGROUND OF THE INVENTION

Feedback regulated power supplies for electronic equipment receive unprocessed and unregulated (uncontrolled) direct voltage from a source of direct voltage such as a motor driven generator, batteries floating on the output of a generator or from the alternating current (AC) mains by way of a rectifier and filter capacitor arrangement. Such uncontrolled direct voltage (often known as DC voltage) may vary widely in amplitude, and may include transient fluctuations. Modern electronic equipment often requires energizing voltage which is closely controlled in magnitude and free of significant perturbations. Power supply regulators accept uncontrolled direct voltage and process the direct voltage by means of feedback regulation to generate regulated direct voltage for application to the equipment to be powered.

Simple regulators include a variable impedance element or active device serially connected between the source of direct voltage or the voltage to be regulated and the equipment to be supplied with regulated voltage. The series impedance of the active device is controlled in a feedback manner to form what amounts to a voltage divider having a controllable voltage division ratio which adapts in order to maintain the tap voltage constant or regulated. This well known type of regulator may not be satisfactory for some applications because of its relatively low efficiency. For those cases in which highest efficiency is desired, or when a regulated output voltage is desired which is greater than the voltage supplied to the regulator, a switching regulator may be used. In general, switching regulators include a high speed solid-state switch serially connected with an inductor. The operation of the switch is controlled in such a fashion as to generate a varying current in the inductor. A capacitor integrates the current from the inductor to form the regulated output voltage. Such switching regulators have relatively high efficiency because their principal elements are relatively lossless reactances and switches. As mentioned, switching regulators can be arranged to either increase or decrease the applied input voltage.

The switching rates of switching regulators at the current state of the art are in the kilohertz range, and extend into the hundreds of kilohertz for some applications. At such high frequencies, the reactances of the wires leading from the source of uncontrolled voltage to the regulator can perturb operation of the regulator. It is common practice to connect a capacitor across the input terminals of the regulator to provide a known low impedance source of current at the input to the regulator. In order to prevent radiation of signal from the input conductors of the regulator at the switching frequency and at harmonics of the switching frequency, the input capacitor is often part of a low pass filter arranged to reduce switching transients on the input conductors. This low pass filter also acts on the uncontrolled direct current flowing in response to the uncontrolled direct voltage from the source of uncontrollable direct voltage to the regulator to reduce the magnitude of transients.

There are many applications in which more than one switching regulator and its input capacitor are connected to a single source of uncontrolled direct voltage. For example, a ship or an airplane may have a single engine-driven generator producing unregulated direct current which is routed by way of cables to various locations, at each of which a switching regulator and its inpt capacitor is connected to the cables for being energized therefrom. In order to be able to deenergize an equipment powered by a switching regulator in such a context, a switch is connected between the source of uncontrolled direct voltage and the input terminals of the switching regulator. Closing the switch allows uncontrolled direct current to be applied to the input capacitor and to the switching regulator, which thereafter operates to produce regulated direct voltage with which to energize its associated equipment. Opening the switch deactivates the switching regulator and the equipment. In the context of an airplane or a ship, it should be understood that the switch may be remotely operated, i.e., a relay. At initial turn-on of a switching regulator as by closing a switch connected between the input terminals of the regulator and a source of direct voltage, a large inrush current surge may flow through the switch contacts and through the input capacitor of the switching regulator. The magnitude of the inrush current surge depends upon the source impedance of the source of uncontrolled direct voltage, the impedance of the intervening cables, and the impedance of the input capacitor. These impedances are often not well controlled, and they may change with time. Consequently, the exact magnitude of the inrush current surge is not known, and may be large. It is often desirable to limit the magnitude of the inrush current surge which occurs at initial turn-on to prevent damage to the contacts of the input switch, to the feed cables or to other portions of the system.

U.S. Pat. No. 4,494,064 issued Jan. 15, 1985, to Harkness describes an arrangement for limiting the inrush current occurring upon connection of a capacitive load to a direct voltage with the aid of a series resistance which senses the inrush current. The sensed current is applied to a feedback loop to control a series current regulating transistor. An input inductor slows the rate of increase of the inrush current sufficiently to allow the feedback regulator to react. Such an arrangement may be undesirable for many applications because of the size and weight of an input inductor capable of handling the inrush current without saturating, and because of reliability problems associated with additional feedback circuits used solely for inrush current limiting. U.S. Pat. No. 3,781,637 issued Dec. 25, 1973, to Potter describes an arrangement in the context of an inverter for limiting inrush current into a storage capacitor by use of series current resistance element, while minimizing power dissipation of the resistance element during normal operation. In the Potter arrangement, a silicon controlled rectifier (SCR) is rendered conductive by the inverter circuit to provide a low impedance alternate current path in parallel with the resistance element. Such an arrangement continues to dissipate a significant amount of power, and may not be satisfactory where the regulator requires a voltage very near the minimum value of the uncontrolled direct voltage, because of the forward bias offset voltage of the SCR. This offset voltage is in the vicinity of one volt, and may result in significant power dissipation when the operating current requires several amperes.

U.S. Pat. No. 4,236,198 issued Nov. 25, 1980, to Ohsawa et al. describes a switching regulator with an inrush current protective resistor paralleled by the contacts of a relay which bypass the resistor during normal operation to reduce power dissipation. During normal operation, the relay in this arrangement requires continuous energization of the actuating coil, undesirably dissipating power. Furthermore, electromechanical devices such as relays may undesirably be affected by vibration and other adverse environmental conditions associated with vehicles.

An inrush current surge protective arrangement is desired which avoids the use of electromechanical devices and in which power dissipation is minimized.

SUMMARY OF THE INVENTION

An inrush surge current limited power supply includes a regulator having an input terminal adapted for receiving direct voltage and which also includes an output terminal at which a regulated voltage is generated. The regulator includes a capacitor coupled to the input terminal. An undesirably large surge of current occurs as a result of charging the capacitor if a source of uncontrolled direct voltage is applied to the input terminal of the regulator. A switch is serially coupled with a surge limiting resistor to form a switched resistor which is adapted to be coupled between a source of uncontrolled direct voltage and the input terminal for applying conditioned voltage to the regulator by way of the surge limiting resistor, whereby the surge current is limited to an acceptable magnitude but the resistor undesirably dissipates power during normal operation of the regulator. The power supply includes at least one field effect transistor having a channel connected between source and drain electrodes. The channel is coupled across the resistor and has a conductivity which is low when the voltage applied between the gate and source electrodes is small and has a conductivity which is high when the voltage applied between its gate and source electrodes is large, for preventing large inrush surge currents immediately after the switch is rendered conductive at each turn-on. A source of direct control voltage referenced to one of the input and output terminals of the regulator and coupled to the gate of the field effect transistor produces a control voltage which is the sum of the conditioned or the regulated voltages and a rectified alternating voltage. The direct control voltage is therefore greater than the conditioned or the regulated voltages to which the control voltage generator is referenced. The field effect transistor is rendered conductive at a time after the conditioned or regulated voltage to which the control voltage generator is referenced has risen to near its final value. The channel of the field effect transistor bypasses current around the resistor to thereby reduce excess power dissipation.

DESCRIPTION OF THE DRAWING

FIG. 2a is a diagram, principally in schematic form, illustrating details of the arrangement of FIG. 1, and FIGS. 2b and 2c are schematic diagrams of voltage limiters which may be used in the arrangement of FIG. 2a;

DESCRIPTION OF THE INVENTION

Figure 1:
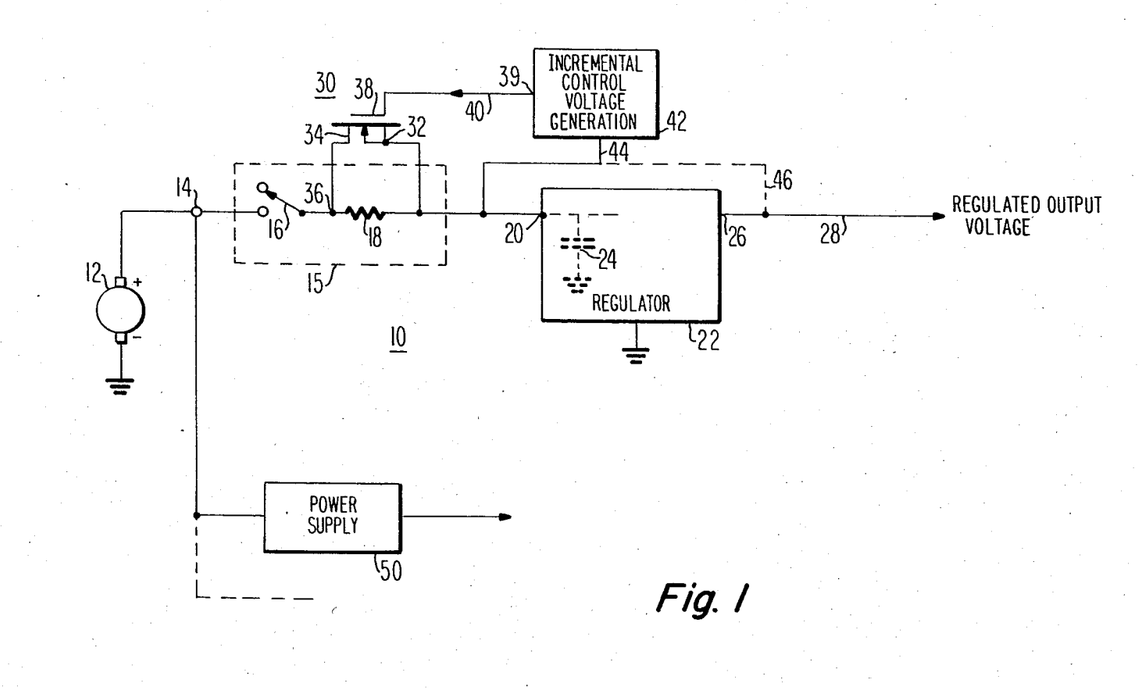
FIG. 1 is a diagram in block and schematic form of a power supply according to the invention.

In FIG. 1, a power supply designated generally as 10 receives at a terminal 14 uncontrolled direct voltage from a generator illustrated as 12. From terminal 14, the uncontrolled direct voltage is applied to a switched resistor 15 in power supply 10, and is also applied to other power supplies, one of which is designated 50. A switch 16 in switched resistor 15 applies the direct voltage by way of a surge limiting resistor 18 to an input terminal 20 of a voltage regulator illustrated as block 22. Regulator 22 includes a capacitor illustrated as 24 connected between input terminal and ground. As mentioned, the charging current flowing in capacitor 24 at initial turn-on might undesirably be large enough to damage the contacts of switch 16 or other components of the system in the absence of current limiting resistor 18. Regulator 22 produces at an output terminal 26 and on an output conductor 28 a regulated output voltage which as known may be greater than, equal to or less than the voltage applied to terminal 20. A field effect transistor (FET) designated generally as 30 includes a source electrode 32 connected to terminal 20 and a drain electrode 34 connected to a junction point 36 connected between switch 16 and resistor 18. Field effect transistor 30 also includes a gate electrode 38. Field effect transistor 30 includes a channel connected between source electrode 32 and drain electrode 34 which has a conductivity which depends upon the voltage between source electrode 32 and gate electrode 38.

A depletion mode transistor is one in which the channel has a high conductivity when the voltage between its source and gate electrodes is zero, and in which a reduction in conductivity of the channel is accomplished by applying a voltage between the source and gate electrodes. If FET 30 were a depletion mode transistor, the conductivity of its channel would be high at the moment of initial turn-on. Consequently, in the absence of gate control voltage, FET 30 would bypass surge limiting resistor 18 and allow the potentially damaging inrush current surge to occur. Transistor 30 is selected to be an enhancement mode transistor so that in the absence of gate voltage at the moment of initial turn-on, the channel is not conductive and the inrush current must flow through surge limiting resistor 18. In effect, the presence of surge limiting resistor 18 increases the impedance of source 12 as seen from regulator terminal 20. When current is high, the voltage at terminal 20 is conditioned by decreasing relative to the uncontrolled voltage by the amount of the voltage drop across resistor 18.

After the inrush current surge has abated and normal operation ensues, the channel of FET 30 must be made conductive in order to bypass surge limiting resistor 18 and reduce power dissipation in the normal operating mode. As mentioned, an enhancement mode FET has a channel which is conductive only when its gate has a greater voltage than its source electrode. In the context of the arrangement of FIG. 1 in which the uncontrolled direct voltage at terminal is 14 positive, gate electrode 38 must be more positive than source electrode 32. When the channel of FET 30 is conductive and FET 30 is therefore in an ON state, resistor 18 is bypassed by a low resistance shunt, and the voltages at terminals 14 and 20 are substantially equal. The conditioned voltage at terminal 20, therefore, is less than the uncontrolled voltage by the voltage drop across resistor 18 when resistor 18 is in-circuit, and, substantially equals the uncontrolled voltage when resistor 18 is bypassed by FET 30. In order for FET 30 to remain on, gate electrode 38 must be maintained more positive than the conditioned direct voltage. Since the uncontrolled and conditioned direct voltages are equal when FET 30 is ON, gate electrode 38 must be more positive than the uncontrolled voltage at terminal 14.

In the arrangement of FIG. 1, a control voltage is applied over a conductor 40 to gate electrode 38 from an incremental control voltage generator 42. Generator 42 generates an incremental control voltage between conductor 40 and a conductor 44. As illustrated, conductor 44 is connected to imput terminal 20 of regulator 22. The incremental voltage generated by control voltage generator 42 is added to the conditioned direct voltage of terminal 20 to generate a direct voltage of magnitude sufficient to turn ON FET 30. Dashed line 46 illustrates an alternative connection of conductor 44 to output terminal 26 of regulator 22. Such a connection may be advantageous when regulator 22 is a boost regulator which generates on output conductor 28 a voltage greater than the conditioned direct voltage applied to input terminal 20.

Figures 2A, 2B, 2C:
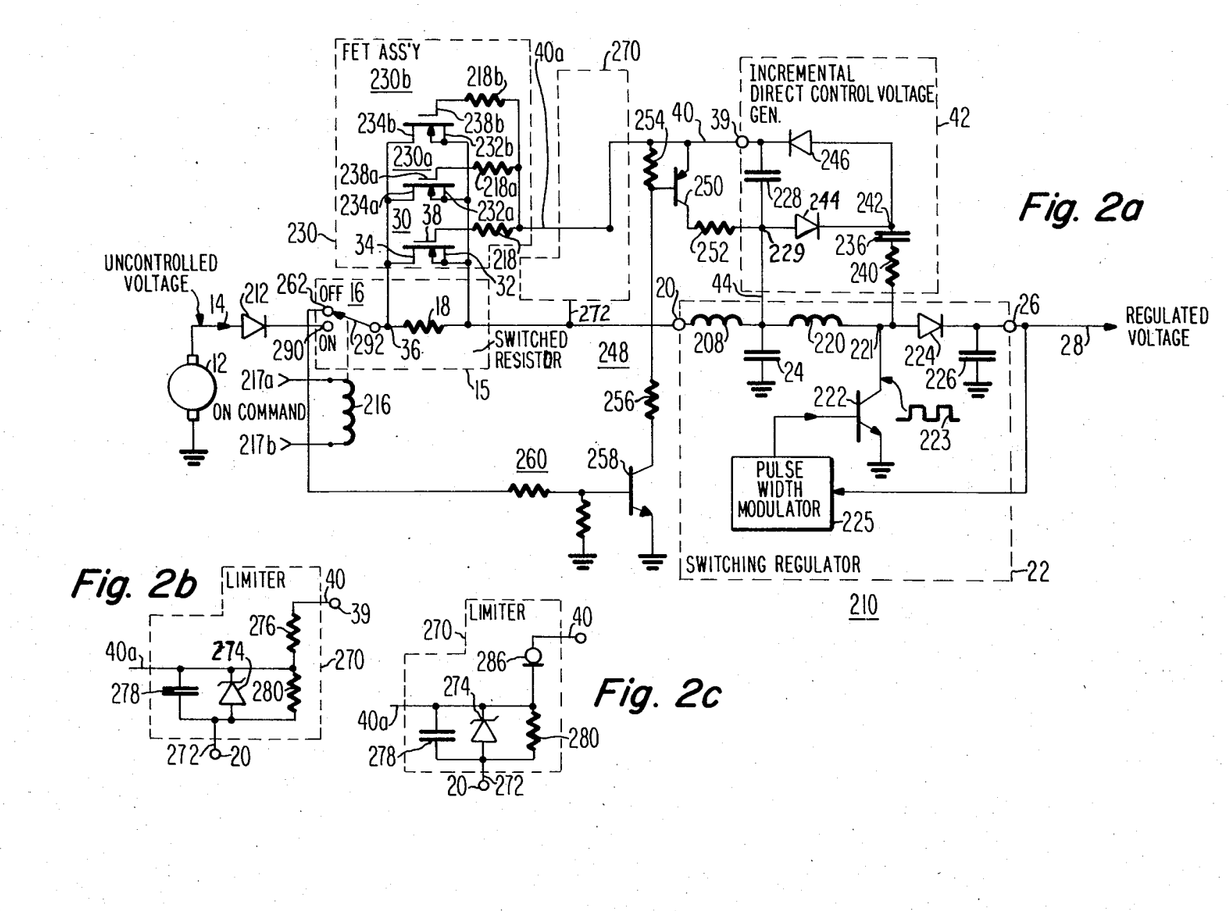

FIG. 2a is a diagram in schematic and block form illustrating details of the arrangement in FIG. 1. In FIG. 2a, elements corresponding to those of FIG. 1 are designated by the same reference numeral. In FIG. 2a, uncontrolled voltage terminal 14 is coupled by way of a diode 212 to switched resistor 15. Diode 212 prevents discharge of capacitor 24 through voltage source 12 in the event that source 12 fails to produce voltage, and therefore prevents a reverse current surge. Switch 16 of switched resistor 15 is part of a relay including a movable element or wiper 292 for connection to one of terminals 262 and 290, and a coil 216 coupled to a pair of terminals 217a and 217b for receiving an ON command for energizing power supply 210 from source 12.

In FIG. 2a, FET 30 is part of a FET assembly 230. FET 30 has its source electrode 32 connected to the source electrodes 232a and 232b of additional FET transistors 230a and 230b, respectively. Similarly, drain 34 of FET 30 is connected to drain electrodes 234a and 234b of FETS 230a and 230b. Thus, the channels of additional FETs 230a and 230b are connected in parallel with the channel of FET 30 for additional power handling capability. Simultaneous control of the FETs of FET assembly 230 is provided by connecting gate electrode 38 to gate electrodes 238a and 238b of FETs 230a and 230b, respectively, by way of oscillation suppression resistors 218, 218a and 218b. Since FET assembly 230 merely acts as a single FET with enhanced power handling capability, it is treated hereinafter as though it were a single FET 230.

As illustrated in FIG. 2a, switching regulator 22 includes the series combination of inductors 208 and 220, junction 221, and the collector-to-emitter path of switching transistor 222 connected between input terminal 20 and ground. Small-value filter inductor 208 does not materially affect the basic operation of regulator 22. A pulse width modulator 225 is coupled to regulator output terminal 26 for sampling regulated output voltage and for driving the base of transistor 222 with a pulsed current of variable pulse width for recurrently switching transistor 222 from a conductive to a nonconductive state. In its conductive state, the collector of transistor 222 is effectively at ground and the conditioned voltage applied to terminal 20 causes a linearly increasing current to flow in inductor 220, resulting in energy storage. When transistor 222 is thereafter switched to its nonconductive state, the energy stored in inductor 220 causes the voltage at junction 221 to tend to rise (become more positive than) above the voltage at terminal 20. Thus, the voltage at junction 221 recurrently pulses between ground and a voltage which tends more positive than the voltage at terminal 20, as indicated by the pulsatory waveform 223. A diode 224 has its anode connected to junction 221 and its cathode connected by a filter capacitor 226 to ground. When the voltage at junction 221 tends to rise above the regulated output voltage, diode 224 conducts and allows the energy stored in inductor 220 to flow into capacitor 226 to maintain the regulated voltage. The magnitude of the regulated voltage may be greater or less than the magnitude of the voltage at terminal 20. Switching regulators such as 22 are well known, and no further explanation of the operation is necessary.

Incremental direct control voltage generator 42 includes a capacitor 228 having a first electrode coupled to a node 229 and by conductor 44 to input terminal 20 (neglecting inductor 208). Generator 42 also includes a capacitor 236 having an electrode connected by way of a current limiting resistor 240 to junction 221 for AC coupling pulsatory voltage from junction point 221 to a node 242. A rectifier arrangement, which includes a first rectifier 244 having its anode connected to node 229 and its cathode connected to node 242, and a second rectifier 246 having its anode connected to node 242 and its cathode connected to terminal 39 and to conductor 40, rectifies the alternating voltage at node 242 to generate an incremental direct voltage across capacitor 228. The direct control voltage on conductor 40 for application to the gate of FET 230 is the sum of the voltage at terminal 20 and the voltage across capacitor 228, which corresponds to the sum of the conditioned voltage and the incremental voltage. The sum control voltage is applied by way of conductor 40 to the gate of FET 230.

In operation after initial turn-on, the voltage at terminal 20 rises as capacitor 24 becomes fully charged. This voltage rise is coupled by way of diode 224 to output terminal 26. As the voltage rises, switching operation of transistor 222 commences, to produce an increasing alternating voltage at node 242 which is rectified to produce the incremental voltages across capacitor 228. Thus, as time progresses after initial turn-on, both the conditioned voltage at terminal 20 and the incremental voltage across capacitor 228 increase to create an increasing sum voltage on conductor 40, which eventually renders FET 230 conductive to bypass surge limiting resistor 18. Since the source of FET 230 is connected to input terminal 20, no amount of increase of the conditioned voltage can turn the FET on; the incremental voltage applied between source and gate turns the FET on.

As so far described, power supply 210 may fail to operate correctly under certain circumstances. For example, if the uncontrolled direct voltage applied to input terminal 14 is momentarily interrupted, as for example by momentary turn-off of switch 16, capacitor 24 may discharge as regulator 22 continues to operate, but capacitor 228 will remain charged because the gate of FET 230 draws very little current. When uncontrolled power is restored to terminal 14 after a momentary disconnect, FET 230 is conductive to bypass surge limiting resistor 18, but capacitor 24 is uncharged, so that an undesirably large input surge current can result as current flows into uncharged capacitor 24. This undesirable condition following a momentary turn-off of the uncontrolled power is corrected by a protection circuit designated 248, which includes a PNP switch transistor 250 having its emitter connected to conductor 40 and its collector connected by way of a current limiting resistor 252 to input terminal 20. The base of transistor 250 is connected by way of resistor 254 to conductor 40 and by way of resistor 256 to the collector of an NPN transistor 258. The emitter of transistor 258 is grounded, so that when transistor 258 is nonconductive, no current flows through resistors 254 and 256, and transistor 250 receives no base emitter voltage and remains nonconductive. When transistor 258 is conductive, the sum control voltage between conductor 40 and ground is applied across a voltage divider consisting of resistors 254 and 256, the tap which is connected to the base of transistor 250, rendering it conductive. The base of transistor 258 is connected by a voltage divider designated generally as 260 to a terminal 262 of switch 16. When switch 16 is momentarily thrown to the OFF position (illustrated) and back to the ON position (not illustrated), the residual voltage across capacitor 24 in the OFF position of switch 16 is applied by way of resistor 18 and terminal 262 of switch 16 to energize voltage divider 260 and turn transistor 258 ON, thereby making transistor 250 conductive and discharging capacitor 228. Thus, a momentary opening of switch 16 immediately discharges capacitor 228 and renders FET 230 nonconductive in readiness for surge protection immediately following turn-on.

A power supply such as 210 of FIG. 2a may be used in several locations in a single vehicle. It may be desirable to design power supply 210 as a standard unit in which the pulse width modulator may be adjusted, as by a screwdriver adjustment, to produce various output voltages suited to the particular application. When the pulse width modulator is set to produce a relatively low regulated output voltage, the peak-to-peak voltage excursion at junction 221 will be smaller than when pulse width modulator 224 is set to produce a relatively high regulated output voltage. Since the voltage at junction 221 is coupled to node 242 and rectified to produce the incremental direct control voltage, it can be seen that the incremental control voltage will vary in magnitude depending upon the magnitude of the regulated output voltage at output terminal 26. Thus, the magnitude of the sum control voltage applied by way of conductor 40 to the gate of FET 230 may vary, depending upon the setting of the regulator. This may give rise to an excessive gate-to-source voltage when the regulator is set for a high output. In order to prevent application of excessive gate-to-source voltage to the FET, a voltage limiter 270 is coupled between incremental generator 42 and FET assembly 230. The location of the limiter is illustrated by the dashed outline 270 in FIG. 2a.

FIG. 2b is a schematic diagram of a limiter which may be used in the location of limiter 270 of FIG. 2a. In FIG. 2b, limiter 270 includes a zener regulator including a zener diode 274 having its anode connected by way of a conductor 272 to terminal 20. The cathode of zener diode 274 coacts with a resistor 276 connected between its cathode and terminal 39 to limit the voltage applied over conductor 40a to the gate of FET 230. A capacitor 278 filters noise attributable to operation of zener diode 274. A resistor 280 discharges capacitor 278 when the voltage across zener diode 274 is less than the zener voltage and the zener diode is nonconductive. The limited voltage across capacitor 278 is applied across the gate and source of FET 230.

During a momentary turn-off of switch 16, the residual voltage across capacitor 24 (FIG. 2a) maintains transistor 250 conductive, as described above. Transistor 250 when conductive couples terminal 39 to terminal 20 by a low resistance path. In effect, this parallels resistor 280 with resistor 276, thereby providing for rapid discharge of capacitor 278, rendering FET 230 nonconductive in readiness for an immediately following turn-on.

As known, the regulation of a voltage limiter such as that of FIG. 2b depends upon the ratio of the resistance of resistor 276 to the dynamic impedance of zener diode 274. FIG. 2c is a schematic diagram of a limiter similar to that of FIG. 2b which provides a sharper limiting knee. In FIG. 2c, elements corresponding to those of FIG. 2b are designated by the same reference numeral. In the arrangement of FIG. 2c, a sharper limiting knee is provided by substituting for resistor 276 of FIG. 2b a constant current diode 286. A constant current diode is a diode which when operated in a reverse-bias mode has a dynamic impedance which can be very high by comparison with that of a simple resistor. The coaction of the high dynamic impedance of constant current diode 286 with the low dynamic impedance of zener diode 274 provides improved limiting action during normal operation. During momentary turn-off of switch 16, constant current diode 286 is coupled across resistor 280 by conductive transistor 250. This causes diode 286 to become forward biased. In the forward biased state, diode 286 has a low forward voltage characteristic such as that of a common diode. During momentary turn-off of switch 16, therefore, the limiter of FIG. 2c provides faster discharge of capacitor 278 than does the limiter of FIG. 2b. The use of a limiter such as those of FIGS. 2b or 2c in location 270 of the power supply of FIG. 2a makes the maximum FET gate voltage independent of the magnitude of the sum control voltage appearing on conductor 40.

Since only that portion of the control voltage appearing across capacitor 278 of limiter 270 is applied between the source and gate of FET 230 and is operative to render it conductive, it is possible to delay the time at which FET 230 bypasses resistor 18 by appropriate selection of time constants. The capacitance of capacitor 278 may be selected in conjunction with the resistance of resistor 276 or with the current of constant current diode 286, as appropriate, to generate an increasing ramp voltage across capacitor 278 beginning at initial turn-on which at a particular time thereafter reaches the FET 230 source-to-gate voltage at which conduction of the FET channel begins. Thus, capacitor 278 and either resistor 276 or constant current diode 286 may provide the dual functions of voltage limiting and delay of FET turn-on. The importance of the delay time generated by the coaction of either capacitor 278 and resistor 276 or capacitor 278 and constant current diode 286 can be explained as follows. Input capacitor 24 charges after the moment that switch 16 is turned on with a certain time constant which is controlled by resistor 18. If capacitor 24 partially charges, to a voltage at which boost regulator 22 begins switching, and FET 230 were immediately turned on by the incremental voltage, an undesirable second current surge would occur in capacitor 24. It is therefore desirable to have a delay between the time the boost regulator 22 begins switching and FET 230 is turned on so that capacitor 24 is very nearly fully charged before FET 230 is rendered conductive.

The power supply of FIG. 2a may not limit input surge current in the event that switch 16 is momentarily turned off and then back on. This condition may result when capacitor 226 is much larger than capacitor 24, due to continued operation of regulator 22 after switch 16 is turned off, which discharges capacitor 24 more quickly than capacitor 226 and allows pulse width modulator 225 to continue operation, which causes transistor 222 to continue switching. The switching of transistor 222 and the residue of voltage on capacitor 224 generates sufficient alternating voltage at junction 221 to operate incremental voltage generator 42 and by its operation maintain charge on, or recharge capacitors 228 (and 278, if a limiter is used).

Figure 3:
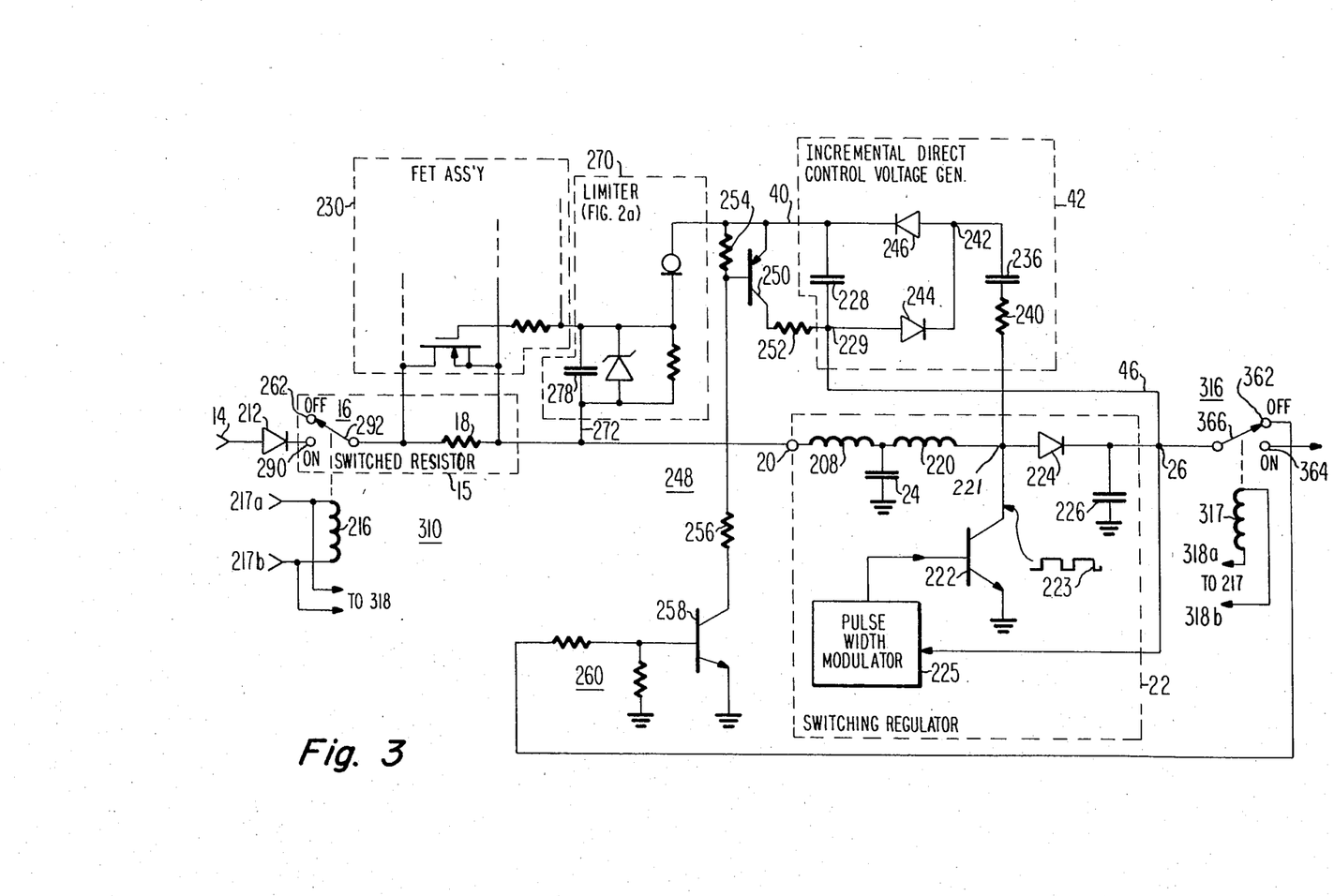
FIG. 3 is a schematic diagram of a power supply similar to that of FIG. 2a with an alternative reference point for a control voltage generator.

FIG. 3 is a schematic diagram of an arrangement including a further switch for disconnecting switching regulator 22 from its load and for connecting the regulated output to the protection circuit. Also, the arrangement of FIG. 3 uses the sum of the regulated output voltage and the incremental direct control voltage for application (by way of a limiter) to the gate of FET 230. Elements of FIG. 3 corresponding to those of FIG. 2a are designated by the same reference numerals. FIG. 3 includes a second controlled switch or relay 316 having a wiper 366, contact points 362 and 364, and a coil 317 adapted to be connected by way of terminals 318a and 318b to terminals 217a and 217b, respectively. Thus, relay 316 is effectively ganged with relay 16. In the ON positions (not illustrated) of switch 316 and switch 16, switch contact 290 provides power for energizing power supply 310, and switch contact 364 applies the regulated output voltage from terminal 26 of power supply 310 to a load (not illustrated). During normal operation, wipers 292 and 366 are in their alternate position (not illustrated), no voltage is applied to voltage divider 260 from contact 366, and protection circuit 248 including transistors 250 and 258 is non-conductive. When relays 16 and 316 are momentarily turned OFF (the illustrated condition) both the source and the load are disconnected from power supply 310, and capacitors 24 and 226 of switching regulator 22 discharge, but at a much slower rate than in the arrangement of FIG. 2a. Switch contact 316 in the illustrated OFF position applies the voltage across capacitor 226 to voltage divider 260, thereby turning ON transistors 250 and 258 of protection circuit 248 and discharging capacitors 228 and 278. The voltage on capacitor 226 will gradually decrease due to the load provided by pulse width modulator 225, until a voltage is reached at which modulator 225 stops operating. The voltage at which this happens is still large enough to maintain protection circuit 248 conductive. When the voltage on capacitor 226 becomes low enough to cause protection circuit 248 to become non-conductive, pulse width modulator 225 will already be off so there is no means for charging capacitors 228 and 278 until power is once again applied. With capacitors 228 and 278 discharged, a return of relays 16 and 316 to the ON condition causes the inrush current to flow through resistor 18. Thus, surge protection is provided in case of momentary turn-off.

In FIG. 3, junction point 229 of incremental generator 42 is connected by way of conductor 46 to regulated output terminal 226. With this arrangement, the voltage applied to conductor 40 is the sum of the incremental direct voltage generated across capacitor 228 summed with the regulated output voltage. This arrangement gives a more closely controlled value of summed control voltage on conductor 40. In the arrangement of FIG. 3, the voltage applied between conductors 40 and 272 of limiter 270 does not equal the incremental direct control voltage, as is the case in the arrangement of FIG. 2a. Instead, the voltage applied between conductors 40 and 272 is the sum of the incremental direct control voltage together with the voltage between input terminal 20 and output terminal 26 of regulator 22. This last voltage depends upon operating conditions, and may vary during operation, and the sum control current may therefore also vary. Limiter 270 stabilizes the source-to-gate voltage, so long as the sum control voltage minus the conditioned voltage at terminal 20 exceeds the threshold of zener diode 274.

Figure 4:
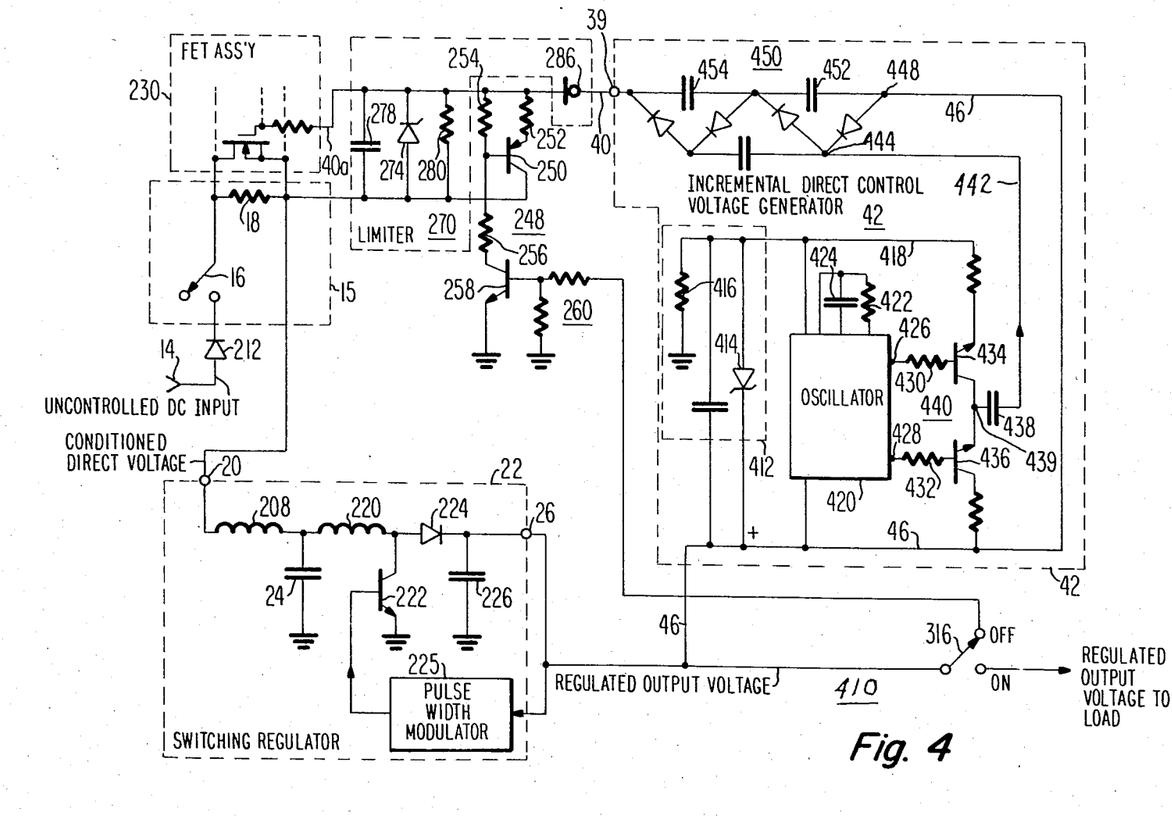
FIG. 4 is a schematic diagram of a power supply according to the invention in which the control voltage generator includes an independently operated oscillator.

FIG. 4 is a diagram principally in schematic form of a power supply 410 generally similar to power supply 310 of FIG. 3, but having an independent oscillator for generating the incremental direct control voltage. In FIG. 4, elements corresponding to those of FIG. 3 are designated by the same reference numeral. In FIG. 4, incremental direct control voltage generator 42 includes a zener regulated power supply 412 including the series combination of a zener diode 414 and a resistor 416 connected between conductor 46 and ground. The voltage across zener diode 414 appears between a bus 418 and conductor 46. An oscillator 420 is coupled to conductor 46 and bus 418 for being energized by the zener voltage. Oscillator 420 oscillates at a frequency established by a resistor 422 and a capacitor 424 to produce mutually antiphase square waves at the oscillation frequency at output terminals 426 and 428. The oscillator output signals at output terminals 426 and 428 are applied by way of resistors 430 and 432, respectively, to the bases of transistors 434 and 436, respectively, of a power amplifier designated generally as 440. Amplifier 440 buffers the oscillator signals to produce a buffered oscillation at a node 439 which is alternating current (AC) coupled by a capacitor 438 to a conductor 442. The alternating voltage on conductor 442 is applied to a node 444 of a voltage multiplying rectifier arrangement designated generally as 450. Voltage multiplying rectifier arrangement 450 is connected at a node 448 to the regulated output voltage on conductor 46, and includes the series combination of capacitors 452 and 454 connected between node 448 and output terminal 39 of generator 42. Voltage multiplying rectifier arrangement 450 rectifies the alternating voltage on conductor 442 to produce across capacitors 452 and 454 an incremental voltage which is added to the regulated output voltage to produce at terminal 39 a sum control voltage. The arrangement has the advantage that oscillator 420 may be optimized for oscillation at voltages lower than those at which switching regulator 22 can operate. Consequently, the arrangement of FIG. 4 can be arranged to produce incremental control voltage and therefor turn on FET 230 at output voltages lower than with the arrangements of FIGS. 2a or 3. Thus, the arrangement of FIG. 4 is suitable for a step-down regulator.

Also in FIG. 4, switch transistor 250 of protection circuit 248 has its collector-to-emitter conductive path connected directly across capacitor 278 of limiter 270. This arrangement is advantageous for rapidly discharging capacitor 278 for providing rapid recovery of the inrush current surge protection arrangement in the event of momentary turn-off of switch 16.

Figure 5:
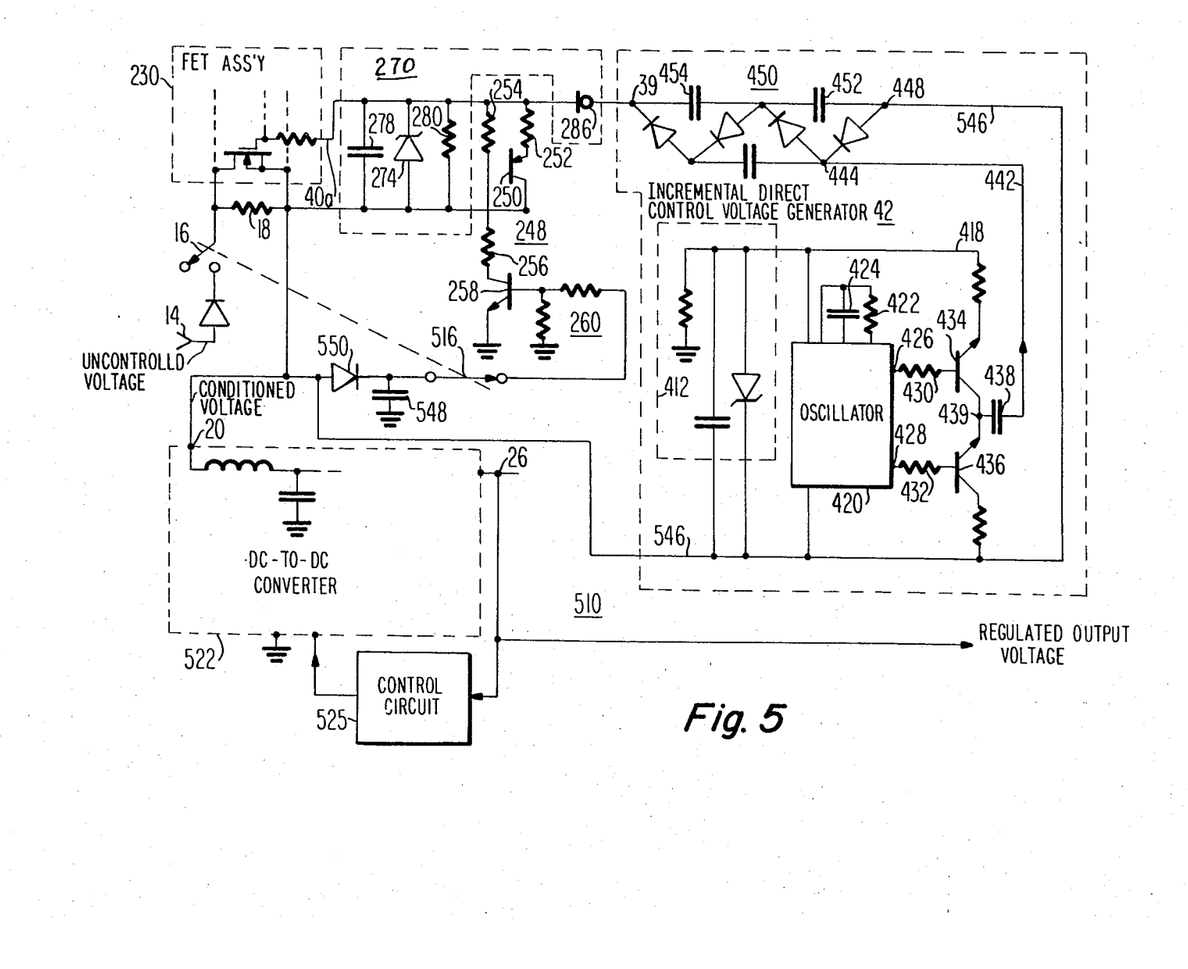
FIG. 5 is a schematic diagram of a power supply similar to that of FIG. 4 in which the control voltage generator is referenced to the conditioned direct voltage.

FIG. 5 is a diagram partially in schematic form of an arrangement for inrush current surge protection using an independent oscillator for those cases in which the switching regulator is conductively isolated between input and output terminals. In FIG. 5, elements corresponding to those of FIG. 4 are designated by the same reference numerals. A regulating DC-to-DC converter in power supply 510 of FIG. 5 provides conductive isolation between input terminal 20 and output terminal 26. Consequently, at initial turn-on no voltage is coupled from input terminal 20 to regulated voltage terminal 26, as was the case with regulator 22 of FIGS. 2b, 3 and 4. As a result, incremental direct control voltage generator 42 including oscillator 420 cannot be powered from regulated output voltage terminal 26 without the incremental direct control voltage generator 42 being dependent upon operation of switching converter 522. In power supply 510, oscillator 420 of incremental direct control voltage generator 42 is energized from a conductor 546 which is connected to input terminal 20 of converter 522 for receiving conditioned direct voltage. Thus, oscillator 420 may operate as soon as the conditioned direct voltage reaches a sufficient level to cause oscillator 420 to produce alternating voltage, which is rectified by arrangement 450 and summed with the conditioned voltage appearing on conductor 546 to generate a summed voltage at terminal 39.

Also in power supply 510, voltage divider 260 of protection circuit 248 is connected by way of the contacts of a switch 516 to a storage capacitor 548. Switch 516 is ganged with relay 16. Capacitor 548 is charged by way of a diode 550 from the conditioned direct voltage. Switch 516 closes or makes contact when relay 16 opens, thereby applying the voltage stored on capacitor 548 to voltage divider 260 to turn ON transistors 258 and 250 to discharge capacitor 278 and render FET 230 nonconductive in readiness for the next turn-on. Capacitor 548 is dimensioned so that it will store enough charge to keep transistors 258 and 250 turned on during the time it takes the regulated output voltage at terminal 26 to drop and capacitors 452 and 454 to discharge. This provides continued protection in the event of a turn-off of greater than momentary duration, by continuing conduction of transistor 250 until the output voltage of terminal 26, and the voltage across capacitors 452 and 454 diodes, and oscillator by oscillator 420 ceases.

Other embodiments of the invention will be apparent to those skilled in the art. For example, the power supply may produce positive or negative voltage referenced to ground or to other reference voltage.

What is claimed is:

1. An inrush surge current limited power supply, comprising:
   regulating means including an input terminal adapted for receiving voltage to be regulated and also including an output terminal at which a regulated voltage is generated, said regulating means further including capacitance means coupled to said input terminal, whereby if a source of uncontrolled direct voltage is applied to said input terminal an undesirably large surge current occurs as a result of charging said capacitance means;
   first switch means serially coupled with surge limiting resistance means to form a switched resistor, said switched resistor being coupled to said input terminal of said regulating means and also being adapted to be coupled to said source of uncontrolled direct voltage for applying conditioned direct voltage to said input terminal of said regulating means whereby said input surge current is limited to an acceptable magnitude, but said resistance means undesirably dissipates power during normal operation of said regulating means;
   at least one field effect transistor including a gate electrode and a channel connected between source and drain electrodes, said channel being coupled across said resistance means and having conductivity which is low when the voltage between said gate and source electrodes is small and high when said voltage between said gate and source electrodes is large for preventing large surge currents immediately after said first switch means is rendered conductive at each turn-on;
   a source of direct control voltage coupled to one of said input and output terminals of said regulating means and to said gate of said field effect transistor for generating an incremental direct control voltage from a source of alternating voltage and for adding said incremental direct control voltage to one of said conditioned and regulated voltages to generate and apply to said gate a sum direct control voltage, whereby said sum direct control voltage is greater than said one of said conditioned and unregulated voltages, whereby said field effect transistor is rendered conductive at a time after said one of said conditioned and regulated voltages have risen to near their steady-state values to bypass current around said resistance means thereby reducing said undesirable power dissipation.

2. A supply according to claim 1, wherein said regulating means comprises:
   a serial combination, said serial combination including inductance means and controllable second switch means, one end of said serial combination being coupled to said input terminal of said regulating means for receiving said conditioned voltage;
   control means coupled to said controllable second switch means and to said output terminal of said regulating means for recurrently alternating the state of said controllable second switch means between conduction and nonconduction for generating a varying current through said inductance means and a time varying voltage associated with said serial combination;
   rectifying means coupled to said inductance means for rectifying said varying current to produce rectified variable current; and
   second capacitance means coupled to said rectifying means and to said output terminal of said regulating means for intergrating said rectified variable current for producing said regulated voltage.

3. A supply according to claim 2 wherein said source of alternating voltage comprises third capacitance means including a first electrode coupled to a terminal of said controllable second switch means.

4. A supply according to claim 3 wherein said source of direct control voltage further comprises rectifying means coupled to a second electrode of said third capacitance means for producing a flow of pulsatory current in response to said varying voltage associated with said second serial combination; and
   fourth capacitance means including a first electrode coupled to said input terminal of said regulating means and a second electrode coupled to said rectifying means for integrating said pulsatory current for producing said sum direct control voltage at said second electrode of said fourth capacitance means.

5. A supply according to claim 4 wherein said rectifying means comprises a first rectifier coupled to said second electrode of said third capacitance means and to said second electrode of said fourth capacitance means, and a second rectifier coupled to said second electrode of said third capacitance means and to said first electrode of said fourth capacitance means, said first and second rectifiers being arranged with disparate poles coupled to said second electrode of said third capacitance means.

6. A supply according to claim 4 further comprising voltage limiting means coupled to said source of direct control voltage for limiting the magnitude of said sum direct control voltage applied to said gate.

7. A supply according to claim 4 further including protection means for protecting said supply against surge currents which might occur in the event of a momentary turn-off of said first switch means, said protection means comprising:
   controllable third switch means including a controlled current path coupled across said fourth capacitance means and also including a control electrode for said controlled current path; and
   fourth switch means coupled to said control electrode of said third switch means and operating cooperatively with said first switch means, said fourth switch means being nonconductive during those times in which said first switch means is conductive, said fourth switch means being conductive during those times in which said first switch means is nonconductive for rendering said third switch means conductive during said momentary turn-off thereby discharging said fourth capacitance means and reducing the magnitude of said sum direct control voltage, thereby rendering said conductivity of said channel of said field effect transistor low and effectively placing said surge limiting resistance means in-circuit.

8. A supply according to claim 4 further including protection means for protecting said supply against surge currents which might occur in the event of a momentary turn-off of said first switch means, said protection means comprising:
   controllable third switch means including a controlled current path coupled across said fourth capacitance means and also including a control electrode for said controlled current path; and
   fourth switch means operating cooperatively with said first switch means, said fourth switch means being nonconductive during those times in which said first switch means is conductive, and said fourth switch means being conductive during those times in which said first switch means is nonconductive to couple said output terminal of said regulating means to said control electrode of said third switch means for rendering said third switch means conductive during said momentary turn-off thereby discharging said fourth capacitance means and reducing the magnitude of said sum direct control voltage, thereby rendering said field effect transistor nonconductive and effectively placing said surge limiting resistance means in-circuit.

9. A supply according to claim 2 wherein said source of direct control voltage comprises:
   third capacitance means having a first terminal coupled to said output terminal of said regulating means and also including an output terminal;
   oscillation means coupled to said output terminal of said regulating means for being powered by said regulated voltage, said oscillation means producing alternating voltage at an output terminal; and
   rectifying means coupled to said output terminal of said oscillation means and to said third capacitance means for generating said sum direct control voltage at said output terminal of said third capacitance means.

10. A supply according to claim 9 further comprising voltage limiting means coupled to said source of direct control voltage for limiting the magnitude of said sum direct control voltage at said gate.

11. A supply according to claim 9 further including protection means for protecting said supply against surge currents which might occur in the event of a momentary turn-off of said first switch means, said protection means comprising:
   controllable third switch means including a controlled current path coupled to said third capacitance means and also including a control electrode for controlling said controlled current path;
   fourth switch means coupled to said control electrode of said third switch means and operating cooperatively with said first switch means, said fourth switch means being open-circuited during those times in which said first switch means is conductive, and said fourth switch means being conductive during those times in which said first switch means is nonconductive to couple said output terminal of said regulating means to said control electrode of said third switch means for rendering said third switch means conductive during said momentary turn-off thereby discharging said third capacitance means and reducing the magnitude of said sum direct control voltage, thereby rendering said field effect transistor nonconductive and effectively placing said surge limiting resistance means in-circuit.

12. A supply according to claim 9 wherein:
   said third capacitance means comprises the serial combination of fourth and fifth capacitance means coupled between said output terminal of said regulating means and said output terminal of said third capacitance means; and
   said rectifying means comprises a plurality of diodes coupled to said oscillation means and connected with said fourth and fifth capacitance means as a voltage multiplier.

13. A supply according to claim 1 wherein said channel of said field effect transistor is paralleled by the channel of a second field effect transistor, and the gates of said first and second field effect transistors are connected together by way of isolating resistors.

14. A supply according to claim 1, wherein said source of direct control voltage includes second capacitance means across which at least said rectified alternating voltage appears during normal operation, and further including protection means for protecting said supply against surge currents occurring as a result of momentary turn-off of said first switch means, said protection means comprising:

controllable second switch means including a controlled current path coupled across said second capacitance means and a control electrode for said controlled current path; and third switch means coupled to said control electrode of said second switch means and to one of said input and output terminals of said regulating means, said third switch means cooperating with said first switch means for coupling said control electrode of said second switch means to said one of said input and output terminals of said regulating means for enabling said second switch means for conduction during those times when said first switch means is nonconductive thereby discharging said second capacitance means during said momentary turn-off thereby reducing the magnitude of said sum direct control voltage and rendering said field effect transistor nonconductive immediately after said momentary turn-off thereby placing said surge limiting resistance means in-circuit for limiting said surge current.

15. A supply according to claim 1 further including voltage limiting means coupled to said source of direct control voltage for limiting the maximum value of voltage applied between said gate and source electrodes, said voltage limiting means comprising:

a zener diode coupled between said gate and source electrodes; and impedance means serially coupled between said gate electrode and said source of direct control voltage.

16. A supply according to claim 15 further comprising second capacitance means coupled across said zener diode.

17. A supply according to claim 15 further comprising second resistance means coupled across said zener diode.

18. A supply according to claim 15 wherein said impedance means comprises second resistance means.

19. A supply according to claim 15 wherein said impedance means comprises a constant-current active device.

20. A supply according to claim 19 wherein said constant-current active device comprises a constant-current diode.

* * * * *